United States Patent
Kuo et al.

(10) Patent No.: US 8,860,720 B1
(45) Date of Patent: Oct. 14, 2014

(54) SYSTEM AND METHOD FOR DELIVERING GRAPHICS OVER NETWORK

(71) Applicant: Ubitus Inc., Tortola (VG)

(72) Inventors: Jung Chang Kuo, Taipei (TW); Wen-Kae Tsao, Taipei (TW)

(73) Assignee: Ubitus Inc., Tortola (VG)

( * ) Notice: Subject to any disclaimer, the term of this patent is extended or adjusted under 35 U.S.C. 154(b) by 0 days.

(21) Appl. No.: 14/146,343

(22) Filed: Jan. 2, 2014

(51) Int. Cl.
*G06T 17/00* (2006.01)
*G06T 15/08* (2011.01)
*H04L 29/08* (2006.01)

(52) U.S. Cl.
CPC ............... *G06T 15/08* (2013.01); *H04L 67/26* (2013.01)
USPC ....................................... 345/420

(58) Field of Classification Search
None
See application file for complete search history.

(56) References Cited

U.S. PATENT DOCUMENTS

| | | | | |
|---|---|---|---|---|
| 6,384,821 B1 * | 5/2002 | Borrel et al. | ........... | 345/421 |
| 7,290,221 B2 * | 10/2007 | Anderson et al. | ........... | 715/848 |
| 7,859,532 B2 * | 12/2010 | Yoshida et al. | ........... | 345/428 |
| 2007/0146372 A1 * | 6/2007 | Gee et al. | ........... | 345/474 |
| 2010/0304862 A1 * | 12/2010 | Coleman et al. | ........... | 463/32 |
| 2013/0120378 A1 * | 5/2013 | Miller et al. | ........... | 345/420 |

OTHER PUBLICATIONS

Aliaga, Daniel G., and Anselmo A. Lastra. "Architectural walkthroughs using portal textures." Proceedings of the 8th conference on Visualization'97. IEEE Computer Society Press, 1997.*

* cited by examiner

*Primary Examiner* — Daniel Hajnik

(57) ABSTRACT

The present invention discloses a method and a system for delivering graphics from a server to a client device over a network. An application running on the server generates a virtual 3D environment containing a plurality of 3D models. The server checks the status of each 3D models in a predetermined order, and then, only those 3D models which are not pre-stored in the client device will all be rendered and encoded by the server into a frame of 2D video stream. The server then sends to the client device the frame and meta data of the 3D models which are pre-stored in the client device via the network. The client device uses the frame as a background for rendering the 3D models which are pre-stored in the client device but not included within the frame, so as to generate a mixed frame for output.

11 Claims, 9 Drawing Sheets

SYSTEM AND METHOD FOR DELIVERING GRAPHICS OVER NETWORK

BACKGROUND OF INVENTION

1. Field of the Invention

The invention relates to a system and a method for delivering graphics over a network, especially relates to a method which provides renderings of 3D objects for 3D applications by combining 3D renderings on client device with a 2D scene provided by a server.

2. Description of the Prior Art

During the past years, online games have become more and more popular all over the world. With the development of cloud computing related systems and technologies, a technology for allowing a server to stream the game contents to provide services has been introduced.

A conventional way to provide such cloud-based online game service is to let the server do almost all of the calculations. Which means, when providing the online game service, the server has to generate a virtual 3D environment containing multiple 3D objects including which can be controlled or moved by players. And then, based on the controlling result of the player, the server renders the virtual 3D environment together with the 3D objects into a 2D game screen to be shown on the payer's device. And then, the server transmits the rendered image to the player's device as a 2D video stream. The player's device then only needs to "display" the 2D video stream, without the need to do the calculations of the 3D rendering. However, such conventional technology performs the rendering on a large number of players in the server, which results in increasing the load of the server for performing the 3D rendering processing. In addition, since the results of game plays are all transmitted in the form of 2D video stream, not only the quality of graphical result is not good enough to present 3D objects, but also the consumption of communication bandwidth between the server and the player's device is considerable as well.

SUMMARY OF THE INVENTION

Accordingly, it is the primary object of the present invention to provide a system and a method for delivering graphics over a network, which can decrease the load of the server, enrich the graphical result displayed on the client device, and save the communication bandwidth between the server and the client device. Especially, the method of the present invention provides renderings of 3D objects for 3D applications by combining 3D renderings on client device with a 2D scene provided by a server.

In order to achieve aforementioned object, the present invention provides a method and a system for delivering graphics over a network. The system comprises: a server and a client device. The method of the invention comprises the following steps:

Step (A): running an application on the server to generate a virtual 3D environment containing a plurality of 3D models. Each of the 3D models being associated with a status for indicating whether or not the 3D model is pre-stored in a client device. The client device connects to the server via a network in order to retrieve graphics containing at least some of the 3D models generated by the application.

Step (B): the server checking the statuses of the 3D models in order to decide which 3D models are to be encoded as a frame of a 2D video stream in such a manner that, those 3D models which are not pre-stored in the client device will all be encoded into the frame.

Step (C): the server sending at least the frame of the 2D video stream to the client device via the network;

Step (D): the client device decoding the frame received from the server and using said frame as a background for rendering the 3D models which are pre-stored in the client device but not included within the frame, so as to generate a mixed frame; and Step (E): the client device outputting the mixed frame as a frame of an output video stream.

In a preferred embodiment, in Step (B), the statuses of the 3D models are checked by the server in an order from the one nearest to a virtual position toward another one farthest to the virtual position; during the check by following said order, when a 3D model is first found to be not pre-stored in the client device, then all 3D models beyond that found 3D model will also be encoded into the frame, no matter those 3D models are pre-stored in the client device or not.

In a preferred embodiment, when a new 3D model appears in the 3D environment, then all 3D models beyond that new 3D model will be encoded into the frame, no matter those 3D models are pre-stored in the client device or not.

In a preferred embodiment, in Step (C), the server also sends the 3D models that are not pre-stored in the client device to the client device in a predetermined order; when the client device receives the 3D model sent by the server, the client device stores the 3D model and then sends a message to the server in order to change the status of the 3D model for indicating the 3D model is now pre-stored in the client device.

In a preferred embodiment, in Step (C), the server also sends a status information of 3D models that are not encoded into the frame to the client device; the client device receives and checks the status information in such a manner that, if any 3D model contained in the status information is not pre-stored in the device receive, then the client sends a request to the server in order to download that 3D model.

In a preferred embodiment, the status information includes meta data of each 3D model that is not encoded into the frame, said meta data include a name, a position, a velocity and an attribute of each 3D model.

In a preferred embodiment, the server further comprises: a 3D Scene Transmitter and a 3D Scene Server. The 3D Scene Transmitter is a library either compiled within the application or dynamically linked in runtime with the application. The 3D Scene Transmitter keeps a list of all 3D models and the status of each 3D model. The status is used to indicate the 3D model being in one of the following status: "Not Ready", "Loading" and "Ready for Client". The 3D Scene Server is a server program running on server with the application. The 3D Scene Server acts as a hub of message transfer between the 3D Scene Transmitter and the client device. The 3D Scene Server also acts as a file download server for the client device to download necessary 3D models from the server.

In a preferred embodiment, the client device further comprises: a 3D Scene Client and a 3D Scene Cache. The 3D Scene Client is a program running on the client device for producing the output video stream and for communicating with the server via the network. The 3D Scene Cache is for storing at least the 3D models previously downloaded from the server.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
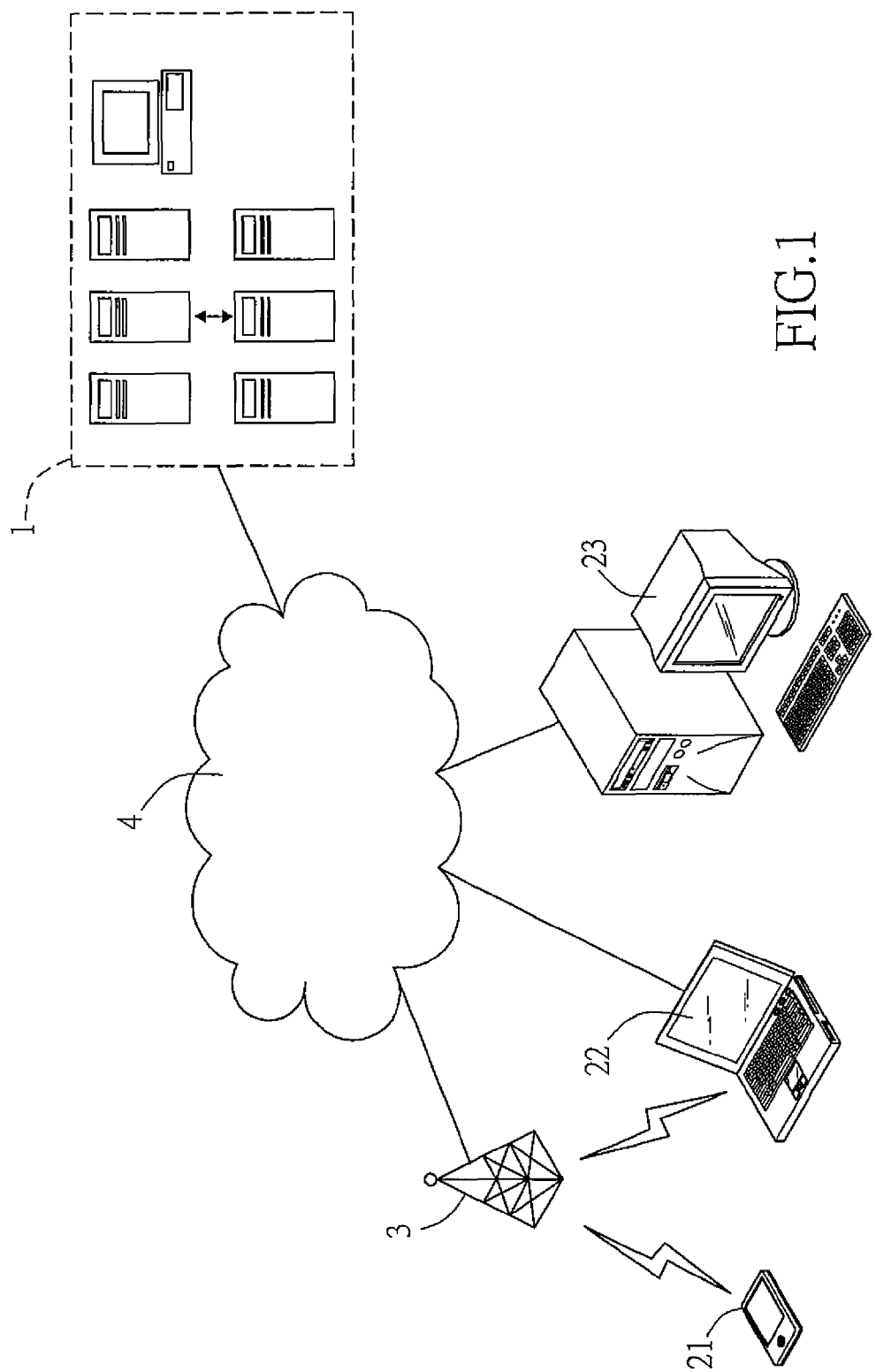
FIG. 1 illustrates a typical embodiment of a system for delivering graphics over a network in accordance with the present invention.

One use of the present invention is in online games, where a player uses a client device to play a game on a server over a network. The server is responsive to commands by the user and generates video for the client's device. Thus, for example, a user makes a move on the client device. The move is transmitted to the server device, which then recalculates an image that is transmitted back to the client's display. In many games, the server generates the 2D images which include the 3D rendering of objects within the field of view.

The present invention parses 3D rendering of objects within the field of view between the server and client device by having the server provides the client device with 3D models as needed. Thus for example, the server provides some or all of the 3D models to the client device, along with meta data, such as the position, orientation and status information, for each 3D model.

As an example, early in the play of a game, all graphics for displaying on the client device, including 3D rendering, are generated by the server and provided as 2D streaming over the network. The system of the present invention pushes models and rendering information for 3D objects within the field of view over the network to the client device, preferably with near-field objects having priority. The system of the present invention has the client device rendering 3D objects when possible, and otherwise has the server rendering the objects.

Once a 3D model is resident on the client device, the server then needs to only provide meta data for that object to the client device. The client device can then render those objects and superimpose them on any 2D video provided by the server. The server will then not need to render the 3D models unless requested by the client device. This method will save GPU cycles on the server. The server can keep a running DB of 3D models for increasing performance in client communication.

The client device's display thus contains a combination of: (a) a 2D video stream of a 3D rendered scene as rendered on server with (b) 3D models downloaded from the server, and stored locally on the client device, and rendered on the client device. This mixing of a 2D video stream with locally rendered 3D models will create a graphically rich 3D scene while reducing bandwidth consumption.

In one embodiment, a 2D video stream is sent to the client device along with the meta-data about the 3D models. The client device checks to see if it has the 3D models stored locally, if not, it will request the 3D models from the server. The client device will locally store the 3D models, building up a library of 3D objects to use when reconstructing a scene locally. In this way, over time, the bandwidth consumption will be little more then what is needed for a video stream but the local result will be graphically rich.

The meta data will allow the client device to correctly mix the locally rendered 3D models with the 2D video stream without missing or duplicating any 3D models. As stated, when client device locally has stored all necessary 3D models, it can reproduce the whole 3D scene, the server no longer needs to render anything, until a new 3D model not available on client device is added into 3D scene. Server will render this new 3D model and all objects behind it until it is locally available on the client device.

Client device will cache the 3D models on the client device's local storage device if possible, to avoid downloading this information again in future execution, so network bandwidth cost can be further reduced. If local storage is not available the request and render process will operate in real time.

FIG. 1 illustrates a typical embodiment of a system for delivering graphics over a network in accordance with the present invention. A server 1 is applied for providing the service of an application executed on the server 1, such service can be, but not limited to, a cloud-based online game service. A plurality of client devices 21, 22, 23 can connect (log in) to the server 1 via a network 4 to use the service provided by the application running on the server 1. In this embodiment, the network 4 is Internet, and the client devices 21, 22, 22 can be any electronic device having the ability to access the Internet, such like (but not limited to) a smart phone 21, a digital plate, a notebook 22, a desktop computer 23, a video game player, or even a smart TV. Some of the client devices 21, 22 are connected wirelessly to the network 4 by means of a mobile station, some others can be connected to the network 4 through a router in a wired manner. The application running on the server 1 generates a virtual 3D environment containing a plurality of 3D models; each of the 3D models being associated with a status for indicating whether or not the 3D model is pre-stored in the client device 21,22,23. In a preferred embodiment of the invention, for each client device, there will be one independent running instance of application. Which means, one application provides the service to one client device only, however, several applications can be executed on the same server for providing services to multiple client devices. The client device 21,22,23 connects to the server 1 via the network 4 in order to retrieve graphics containing at least some of the 3D models generated by the application. The architecture of the system and the features thereof are illustrated in detail in FIG. 2 and its associated description.

Figure 2:
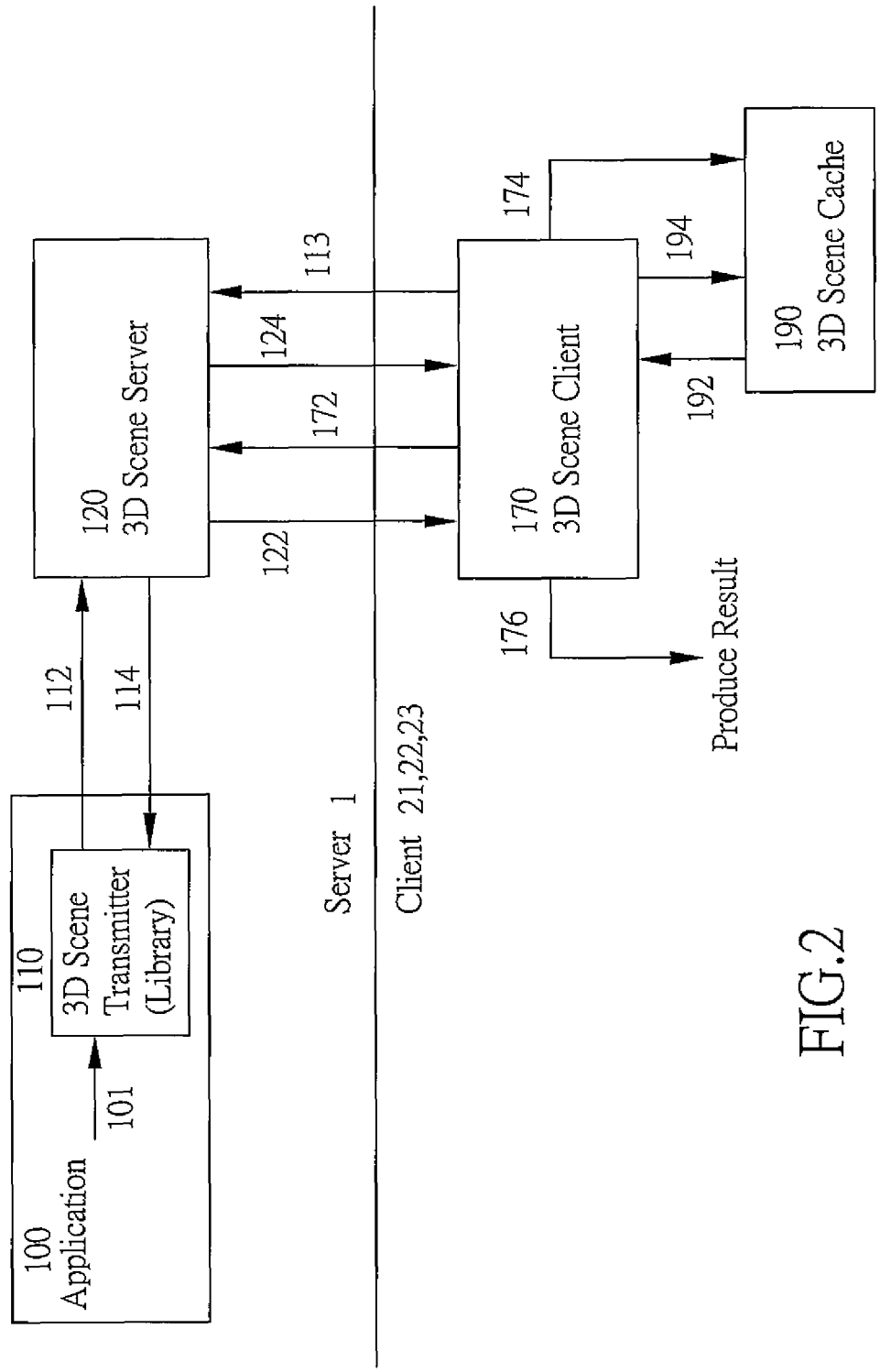
FIG. 2 is a schematic diagram showing an embodiment of a system architecture in accordance with the present invention.

FIG. 2 is a schematic diagram showing an embodiment of a system architecture in accordance with the present invention.

Application 100 is an application generating 3D graphic rendering result, generally a 3D game, running on server 1. The 3D Scene Transmitter 110 is a library compiled within application 100 or dynamically linked in runtime. The 3D Scene Client 170 is a program running on client device 21,22, 23 for producing and then outputting the 3D graphic rendering result of Application 100. In this embodiment, for each client device 21,22,23, there will be one independent running instance of Application 100 and its Scene Transmitter 110.

The 3D Scene Client 170 and the 3D Scene Cache 190 make up the client side code and method for taking advantage of the client's ability to locally render 3D models and scenes.

The 3D Scene Server 120 is a server program running on the server 1 with Application 100. It acts as a hub of message transfer between 3D Scene Transmitter 110 of the server 1 and 3D Scene Client 170 of the client device 21,22,23. It also acts as file download server for 3D Scene Client 170 of the client device 21,22,23 to download necessary 3D models. The 3D Scene Transmitter 110 will keep a list of all 3D models being used and the status of each 3D model. The status is used to indicate the 3D model being in one of the following status, such as: 1) Not Ready; 2) Loading; and 3) Ready for Client.

The main program of application 100 sends the 3D scene information to this 3D scene transmitter 110 by calling its API (path 101 in FIG. 2), including the name, position, velocity, attribute, orientation and all other necessary information of all 3D models it is rendering. After 3D Scene Transmitter 110 receives such information, it will perform the following process:

Step (a): Sort all 3D models to be rendered from near to far relative to a virtual position such as the 3D projection plane (or user's eyes).

Step (b): From the nearest one (nearest to user's eyes), find the first 3D model "M" with status not being "ready for client". That means, the status of the first 3D model "M" is "Not Ready", and therefore we can refer the status "Not Ready" to be the status NR hereinafter for easy understanding. There may be no such 3D model if all 3D models to be displayed are marked as "Ready for Client".

Step (c): Render 3D model M and all following 3D models on server 1. (If no such 3D model M, just generate a black screen.) Then, encode the render result as one frame of 2D Video stream.

Step (d): Transfer following three information ([Info 112-A], [Info 112-B] and [Info 112-C]) to 3D Scene Server 120 (path 112), and 3D Scene Server 120 will transfer it to 3D Scene Server 170 (path 122).

[Info 112-A] The status information of all 3D models before 3D model M. (There may be no such models at all.) These models are all in status "Ready for Client", which means 3D Scene Client 170 is already able to render them on client device 21,22,23. To reduce the consumption of network bandwidth, instead of transferring complete information, 3D Scene Transmitter 110 may only transfer the difference between such information of current rendering and such information of PREVIOUS rendering.

[Info 112-B] If 3D model M exists and its status is "Not Ready" for client device, change its status to "Loading" by client, and send a download request of 3D model M; if the status is already "Loading" by client, do not send any request, for the request is already sent.

[Info 112-C] The encoded video frame in Step (c).

Once 3D Scene Client 170 receives above information, it will perform the following rendering process:

Step (i): Decode the video frame of [Info 112-C] and use the frame as background of following 3D rendering.

Step (ii): Render all 3D models, if any, described in [Info 112-A], above the video frame decoded at Step (i). To reduce network bandwidth, 3D Scene Client 170 will keep this information [Info 112-A] in memory, so for following rendering, 3D Scene Transmitter 110 may only transfer the difference of [Info 112-A] between current rendering and following rendering.

Step (iii): Output result of mixing video and local 3D rendering in Step (ii) as the final produce result (path 176).

If [Info 112-B] is provided, a 3D model M is request to be prepared by 3D Scene Client 170. The 3D Scene Client 170 will perform following process:

Step (I): Search the 3D Scene Cache 190 (path 174). The 3D Scene Cache 190 contains 3D model data files previously downloaded and stored on client device 21,22,23.

Step (II): If 3D model is available in 3D Scene Cache 190, skip to Step (V).

Step (III): If 3D model is not available in 3D Scene Cache 190, 3D Scene Client 170 will send a download request to 3D Scene Server 120. (path 172). The 3D Scene Server 120 will send the data of the 3D model to 3D Scene Client 170. (path 124).

Step (IV): Once the 3D model is downloaded completely, the 3D Scene Client 170 will store it into 3D Scene Cache 190 (path 194). So it does not to be downloaded next time when it is needed.

Step (V): The 3D Scene Client 170 will load 3D model M from 3D Scene Cache 190 (path 192).

Step (VI): Once the loading is done and 3D model M is ready to be used, 3D Scene Client 170 will send a "3D model is ready on client" message to 3D Scene Server 120 (path 113), and 3D Scene Server 120 will transfer this message to 3D Scene Transmitter 110 (path 114).

Step (VII): Once 3D Scene Transmitter 110 receives this message, it will change the status of 3D model M from "Loading" by client to "Ready for Client".

Step (VIII): On next rendering, 3D Scene Transmitter 110 will know that 3D model M is now available on client device, and will request 3D Scene Client 170 to render it, so it is no longer necessary to render this model on server 1.

At beginning, no 3D model is available on client device 21,22,23, so 3D Scene Transmitter 110 will render all 3D models and encode the result as 2D video stream. The 3D Scene Transmitter 110 will send download request [Info 112-B] of 3D model from the nearest one relative to the 3D projection plane (or user's eyes). The 3D Scene Client 170 will download each 3D model from 3D Scene Serve 120, or load from 3D Scene Cache 190 one by one. As more and more 3D models become available on 3D Scene Client 170, 3D Scene Transmitter 110 will inform 3D Scene Client 170 to render these models by itself, and reduce the amount of 3D models rendered by 3D Scene Transmitter 110. Such that, there will be less and less 3D models in the encoded 2D video stream, until eventually all 3D models are available on 3D Scene Client 170. And then, only black screen is encoded in this stage, which means the server 1 no longer needs to transmit 2D video stream to the client device 21,22,23, and thus the consumption of communication bandwidth between the server 1 and the client device 21,22,23 can be significantly reduced.

Once a new 3D model N appears in the scene, 3D Scene Transmitter 110 will (1) inform 3D Scene Client 170 only render all 3D models "in front of" this new 3D model N relative to user's eyes, (2) inform 3D Scene Client 170 to download this new 3D model N, and (3) 3D Scene Transmitter 110 will render this new 3D model N and all models behind it, encode the result as a 2D video stream, and transfer this 2D video stream to 3D Scene Client 170, so 3D Scene Client 170 can still reproduce the 3D graphic rendering result of Application 100, before 3D model N is ready on client device.

Figure 3:
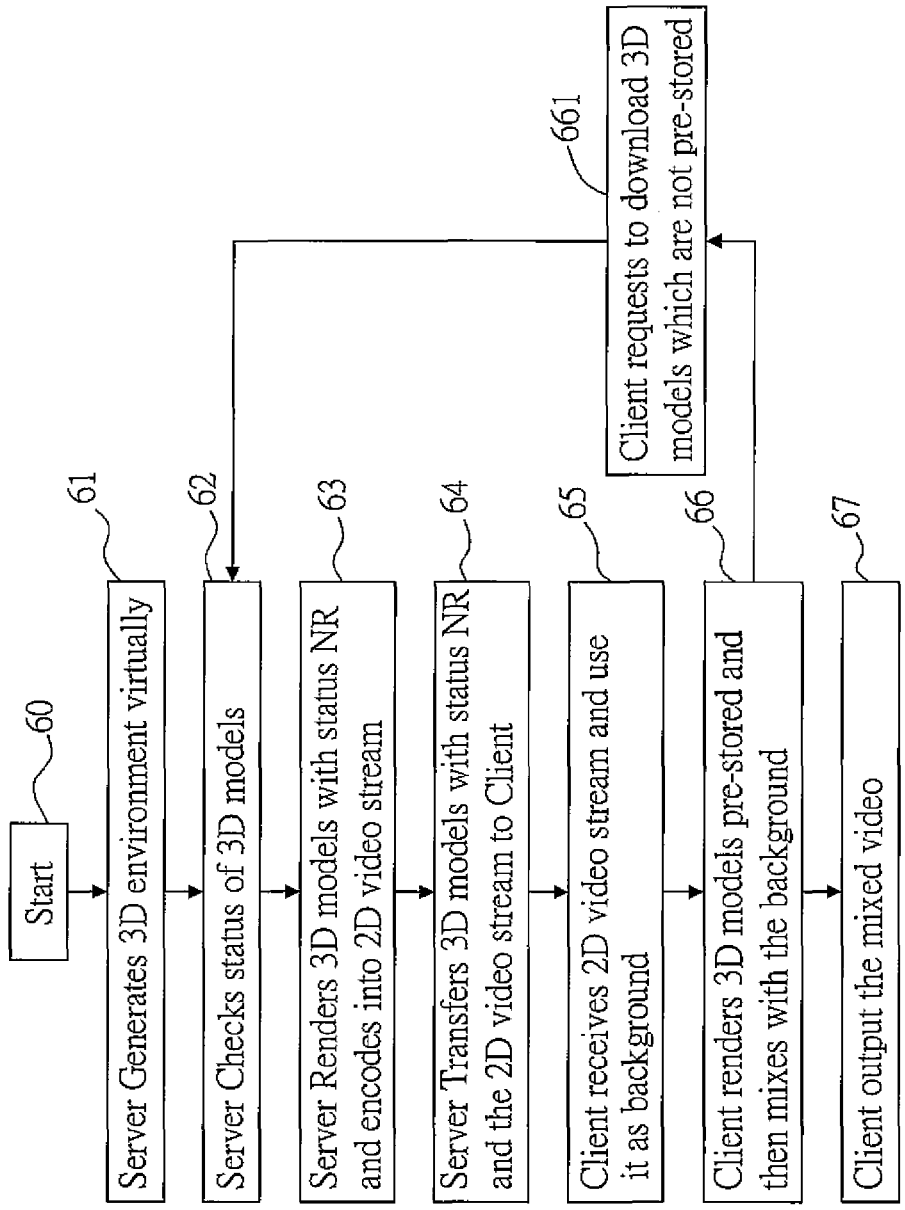
FIG. 3 is a flow chart of an embodiment of the method for delivering graphics over a network in accordance with the present invention as previously illustrated.

FIG. 3 is a flow chart of an embodiment of the method for delivering graphics over a network in accordance with the present invention as previously illustrated. When starting the method for delivering graphics over a network (Step 60), an application running on a server generates a virtual 3D environment containing a plurality of 3D models (Step 61). Each of the 3D models being associated with a status for indicating whether or not the 3D model is pre-stored in a client device.

The server then checks the statuses of the 3D models (Step 62) in order to decide which 3D models are to be encoded as a frame of a 2D video stream in such a manner that, those 3D models which are not pre-stored in the client device will all be encoded into the frame. Wherein, the statuses of the 3D models are checked by the server in an order from the one nearest to a virtual position toward another one farthest to the virtual position. During the check by following the above mentioned order, when a 3D model is first found to be not pre-stored in the client device, then this found 3D model is marked as the status NR, and then this 3D model M and all 3D models beyond this found 3D model M will also be encoded into the frame (Step 63), no matter those 3D models are pre-stored in the client device or not.

Step 64: after the frame of 2D video stream is encoded, the server sends the frame of 2D video stream and the 3D models that are not pre-stored in the client device (i.e., the 3D model with status NR and all 3D models beyond this 3D model M) to the client device in a predetermined order, that is, from the one nearest to the 3D projection plane (or user's eyes) to another one farthest to the 3D projection plane. Once the client device receives the frame of 2D video stream (Step 65), the client device decodes the frame received from the server and uses this frame as a background for rendering the 3D models which are pre-stored in the client device but not included within the frame, so as to generate a mixed frame (Step 66). When the client device receives the 3D model sent by the server, the client device stores the 3D model and then sends a message to the server in order to change the status of the 3D model for indicating the 3D model is now pre-stored in the client device. And then, the client device output the mixed frame as a part of the mixed video stream which is corresponding to the graphics of the virtual 3D environment generated by the application running on the server.

During Step 62, when a new 3D model appears in the 3D environment, then all 3D models beyond that new 3D model will be encoded into the frame, no matter those 3D models are pre-stored in the client device or not.

During Step 64, the server also sends status information of 3D models that are not encoded into the frame to the client device. The client device receives and checks the status information in such a manner that, if any 3D model contained in the status information is not pre-stored in the device receive, then the client sends a request to the server in order to download that 3D model (Step 661). Wherein, the status information includes meta data of each 3D model that is not encoded into the frame. The meta data may include a name, a position, a velocity, an orientation, an attribute and the status of each 3D model.

Figure 4A:
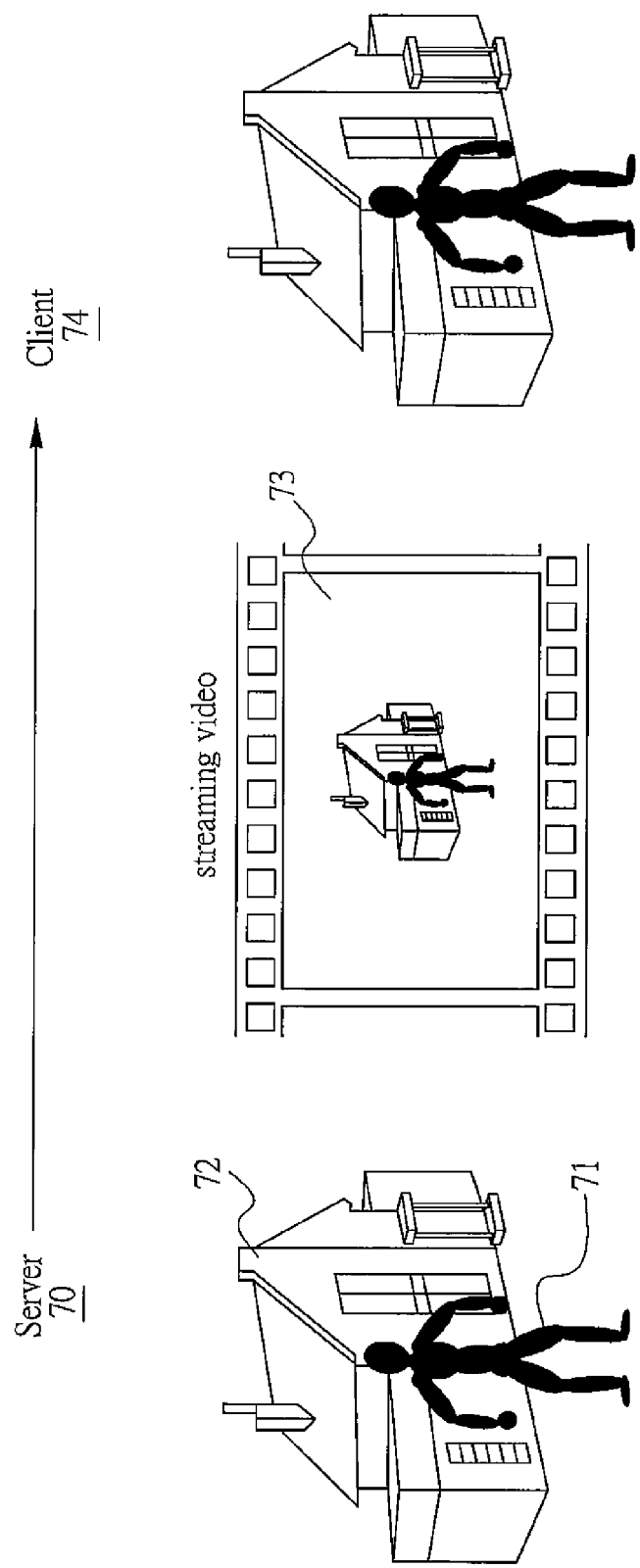
FIGS. 4A, 4B and 4C schematically show an example how the video streaming and 3D models are transmitted in accordance with the method of the present invention.
Figure 4B:
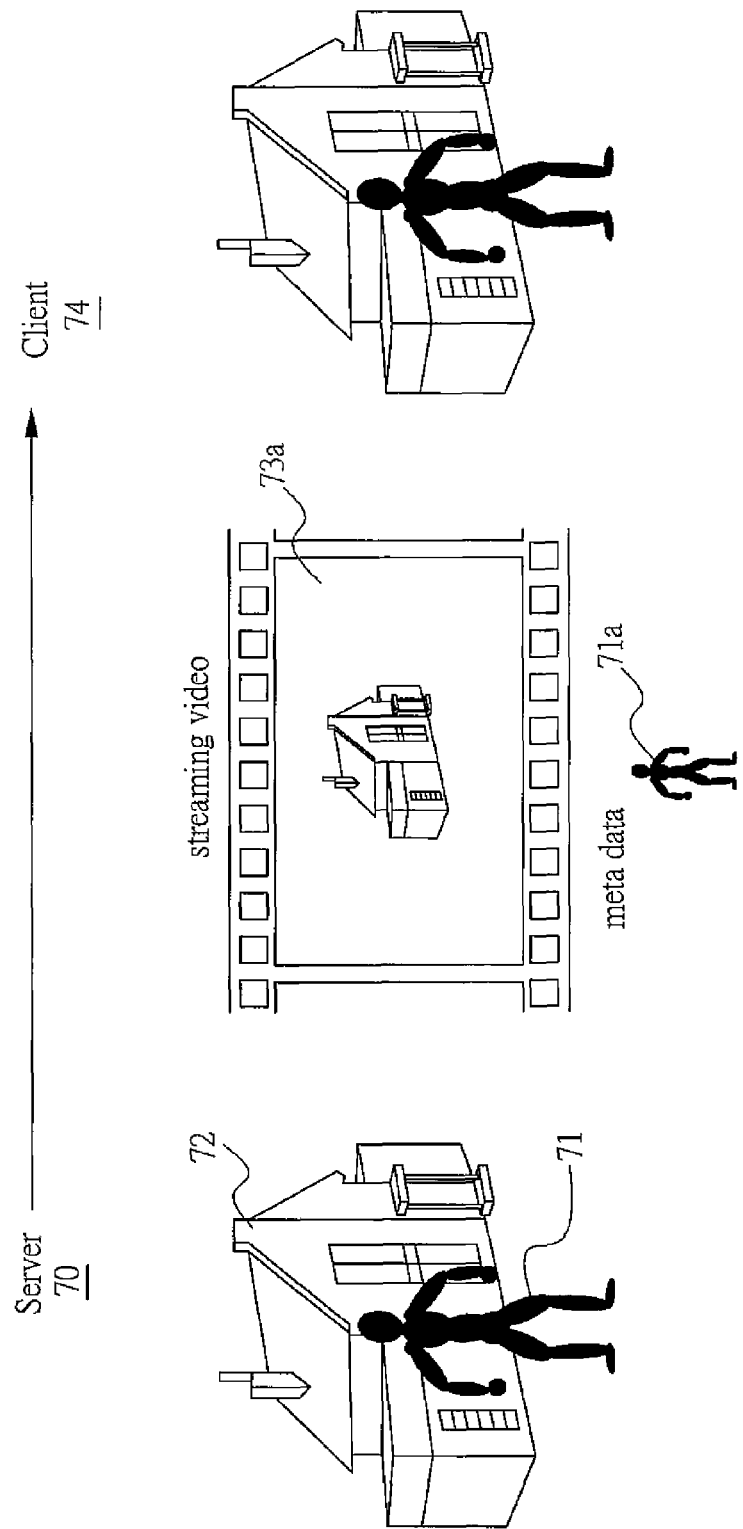
Figure 4C:
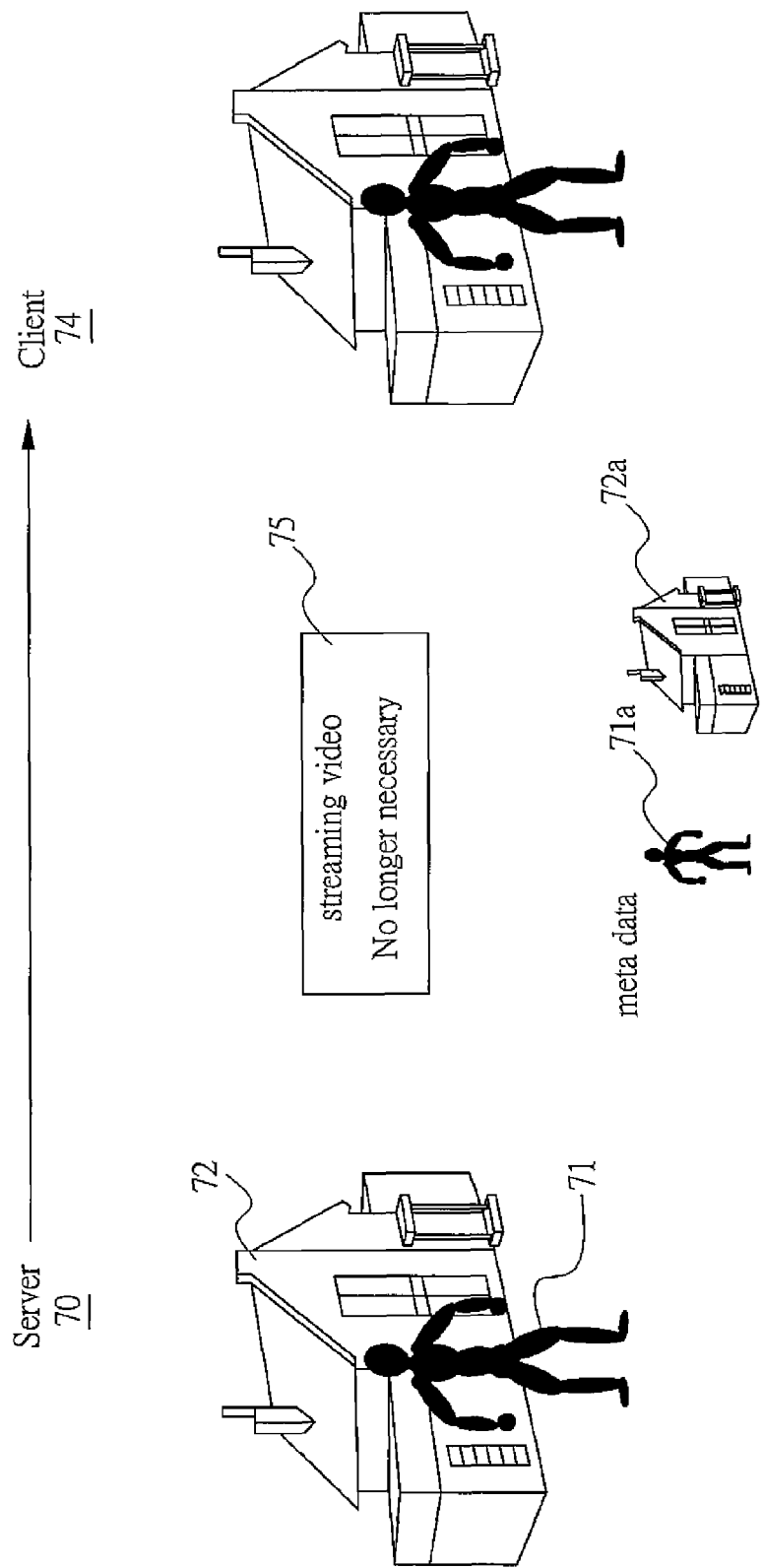

Please refer to FIGS. 4A, 4B and 4C, which schematically show an example how the video streaming and 3D models are transmitted in accordance with the method of the present invention.

As shown in FIG. 4A, at the beginning when the client device 74 logged in the application run on the server 70, there is no 3D model pre-stored in the client device. Therefore, the server renders all of the 3D models (including a person 71 stand in front of a house 72) which should be shown on the client device's screen, encodes the result of rendering as a frame 73 of 2D video stream, and then transfers the frame 73 to the client device 74. In this stage, the frame 73 contains both the person 71 and the house 72, while the client device 74 can just output this frame 71 without the need to render other objects.

And then, as shown in FIG. 4B, the server 70 start sending the 3D models to the client device, starting from the 3D model nearest to the 3D projection plane of the client device's screen. In this embodiment, the person 71 is near to the 3D projection plane (or user's eye) in comparison with the house 72, and thus the 3D model of the person 71 is firstly transmitted to the client device 74. Once the 3D model of the person 71 is transmitted to and stored in the client device 74, the client device 74 send a message to the server 70 to inform that the 3D model of the person 71 is now "pre-stored" in the client device 74. Therefore, the server 70 renders the house 72, encodes the result of rendering as a frame 73*a* of 2D video stream, and then transfers the frame 73*a* together with the meta data of the person 71*a* to the client device 74. The client device 74 then will render the person itself by using the meta data and combine the rendering of the person with the frame 73*a* (including the house) to get the same result of output. This procedure will repeat, e.g., the server 70 transmits the 3D models to the client device 74 one by one, until all of the 3D models which should be shown on the client device's screen are transmitted and pre-stored in the client device 74.

As shown in FIG. 4A, once the client device 74 has all the 3D models, including the 3D models of the person and the house, server no longer needs to do the rendering nor send the frame of video streaming (item 75). The server only needs to transfer the meta data of the 3D models, including the meta data of both the person 71*a* and the house 72*a*, to the client device 74. The client will then perform all of the rendering in order to get the same result of output.

Figure 5A:
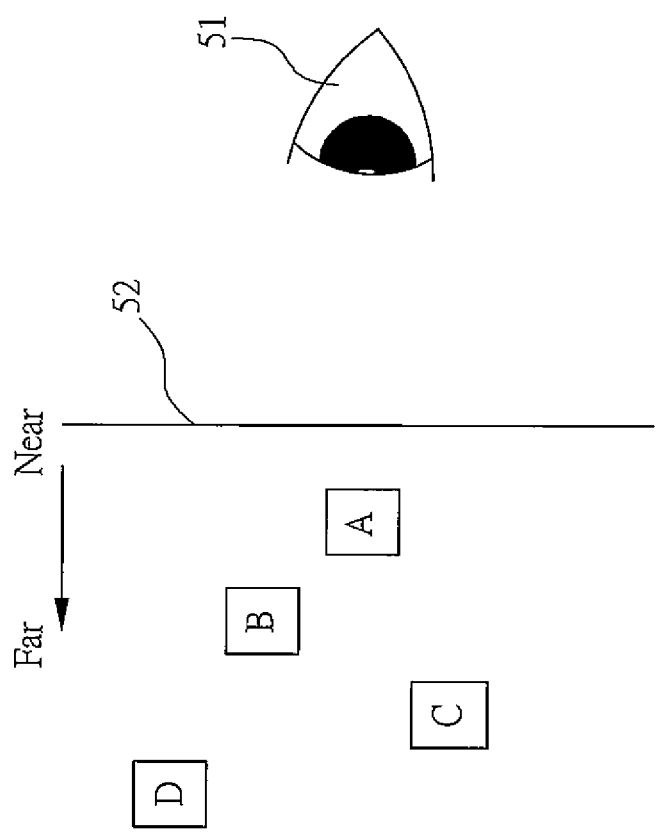
FIGS. 5A, 5B and 5C schematically show an example how to decide what 3D models are to be encoded to the frame in accordance with the method of the present invention.
Figure 5B:
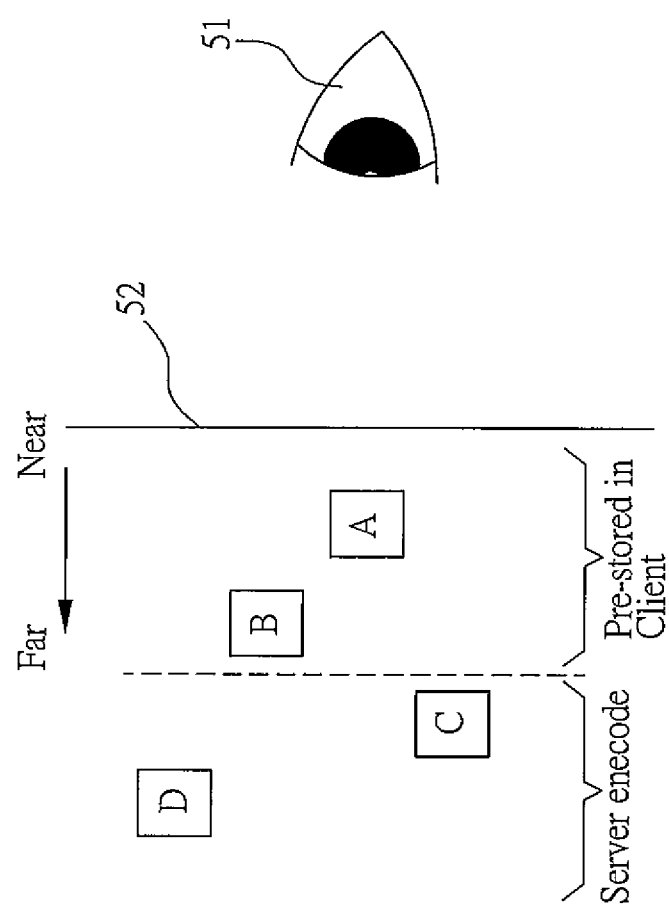
Figure 5C:
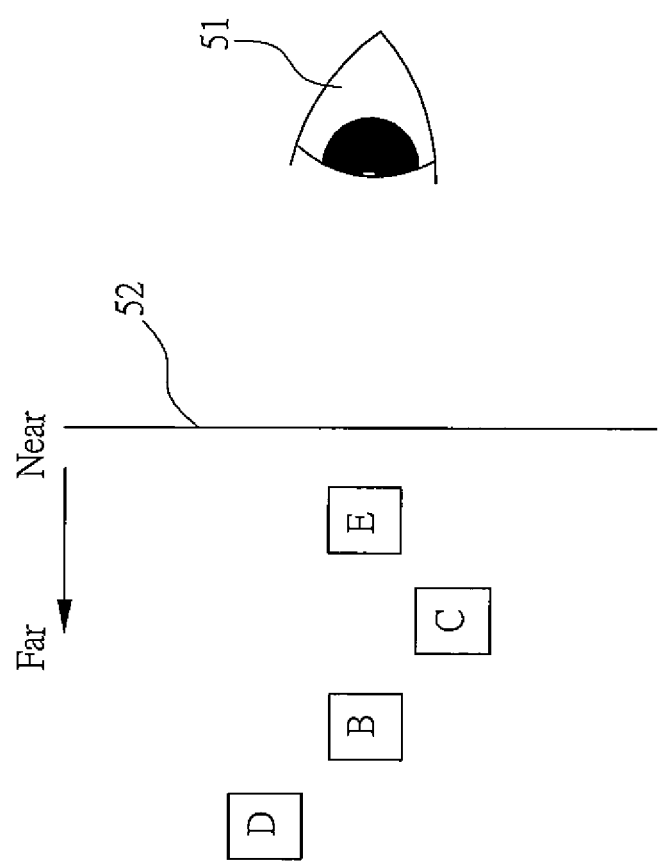

Please refer to FIGS. 5A, 5B and 5C, which schematically show an example how to decide what 3D models are to be encoded to the frame in accordance with the method of the present invention.

In the present invention, the server sorts all 3D models to be rendered from near to far relative to a virtual position such as the 3D projection plane 52 of the client device's screen or the user's eyes 51. As shown in FIG. 5A, four objects A, B, C and D are required to be shown on the client device's screen, where the object A is nearest to the projection plane 52, and then followed by object B, object C and object D in sequence. At the beginning when the client device logged in the application run on the server, there is no 3D model pre-stored in the client device. Therefore, the server renders all of the objects A, B, C and D, encodes the result of rendering as a frame of 2D video stream, and then transfers the frame to the client device. In the mean time, the server also starts transmitting the 3D models of these objects A, B, C and D in the same order previously described, that is, from near to far relative to the 3D projection plane 52 or the user's eye 51. Therefore, the 3D model of object A will first be transmitted, and then object B, and then object C, and then object D, until all 3D models to be shown are finally stored in the client device.

As shown in FIG. 5B, after the 3D models of both the objects A and B are pre-stored in the client device. The server will find that the object C is the first object which is not pre-stored in the client device when the server is checking the statuses of the 3D models in above mentioned near-to-far order. Thereby, the server will render the object C and all other objects behind the object C (e.g., object D), no matter if the 3D model of object D is pre-stored in the client device or not. The 3D models of both objects A and B will not be rendered by the server in this stage, not only because they are pre-stored in the client device, but also because they are located in front of the object C.

As shown in FIG. 5C, when a new object E is shown in the virtual 3D environment created by the application, all objects (including the object E itself) behind this newly presented object E will be rendered by the server, regardless whether that object is pre-stored in the client device or not. For example, it can be seen from FIG. 5C that, the new object E is relatively near to the 3D projection plane 52 in comparison with the objects C, B and D. Although the 3D model of object B has been already pre-stored in the client side, however, because the object B is located behind the new object E, thus all of the objects E, C, B and D are required to be rendered by the server, due to the fact that the object B might be partially or totally covered by other objects in front of the object B.

While the present invention has been particularly shown and described with reference to a preferred embodiment, it will be understood by those skilled in the art that various changes in form and detail may be without departing from the spirit and scope of the present invention.

What is claimed is:

1. A method for delivering graphics over a network, comprising the following steps:

Step (A): running an application on a server for generating a virtual 3D environment containing a plurality of 3D models; each of the 3D models being associated with a status for indicating whether or not the 3D model is pre-stored in a client device;

Step (B): the server checking the statuses of the 3D models in order to decide which 3D models are to be encoded as a frame of a 2D video stream in such a manner that, those 3D models which are not pre-stored in the client device will all be encoded into the frame; wherein in Step (B), the statuses of the 3D models are checked by the server in an order from the one nearest to a virtual position toward another one farthest to the virtual position; during the check by following said order, when a 3D model is first found to be not pre-stored in the client device, then all 3D models beyond that found 3D model will also be encoded into the frame, regardless of whether those 3D models are pre-stored in the client device or not;

Step (C): if there is any 3D model being encoded into the frame by the server in Step (B), then the server sends at least the frame of the 2D video stream to the client device via a network; wherein in Step (C), the server also sends the 3D models that are not pre-stored in the client device to the client device in a predetermined order from the one nearest to the virtual position toward another one farthest to the virtual position; when the client device receives the 3D model sent by the server, the client device stores the 3D model and then sends a message to the server in order to change the status of the 3D model for indicating the 3D model is now pre-stored in the client device; wherein, if all of the 3D models are pre-stored in the client device, then the server no longer needs to do the encoding nor send the frame of the 2D video stream; and Step (D): the client device decoding the frame received from the server and using said frame as a background for rendering the 3D models which are pre-stored in the client device but not included within the frame, so as to generate a mixed frame.

2. The method for delivering graphics over a network of claim 1, wherein when a new 3D model appears in the 3D environment, then all 3D models beyond that new 3D model will be encoded into the frame, no matter those 3D models are pre-stored in the client device or not.

3. The method for delivering graphics over a network of claim 1, wherein said virtual position is a 3D projection plane of the client device's screen.

4. The method for delivering graphics over a network of claim 1, wherein in Step (C), the server also sends a status information of 3D models that are not encoded into the frame to the client device; the client device receives and checks the status information in such a manner that, if any 3D model contained in the status information is not pre-stored in the client device, then the client device sends a request to the server in order to download that 3D model.

5. The method for delivering graphics over a network of claim 4, wherein the status information includes meta data of each 3D model that is not encoded into the frame, said meta data include a name, a position, a velocity and an attribute of each 3D model.

6. A system for delivering graphics over a network, comprising:

a server for running an application to generate a virtual 3D environment containing a plurality of 3D models; each of the 3D models being associated with a status for indicating whether or not the 3D model is pre-stored in a client device; and the client device for connecting to the server via a network in order to retrieve graphics containing at least some of the 3D models generated by the application;

wherein, said graphics are transmitted by the following steps:

Step (B): the server checking the statuses of the 3D models in order to decide which 3D models are to be encoded as a frame of a 2D video stream in such a manner that, those 3D models which are not pre-stored in the client device will all be encoded into the frame; wherein in Step (B), the statuses of the 3D models are checked by the server in an order from the one nearest to a virtual position toward another one farthest to the virtual position; during the check by following said order, when a 3D model is first found to be not pre-stored in the client device, then all 3D models beyond that found 3D model will also be encoded into the frame, regardless of whether those 3D models are pre-stored in the client device or not;

Step (C): if there is any 3D model being encoded into the frame by the server in Step (B), then the server sends at least the frame of the 2D video stream to the client device via a network; wherein in Step (C), the server also sends the 3D models that are not pre-stored in the client device to the client device in a predetermined order from the one nearest to the virtual position toward another one farthest to the virtual position; when the client device receives the 3D model sent by the server, the client device stores the 3D model and then sends a message to the server in order to change the status of the 3D model for indicating the 3D model is now pre-stored in the client device; wherein, if all of the 3D models are pre-stored in the client device, then the server no longer needs to do the encoding nor send the frame of the 2D video stream;

Step (D): the client device decoding the frame received from the server and using said frame as a background for rendering the 3D models which are pre-stored in the client device but not included within the frame, so as to generate a mixed frame; and Step (E): the client device outputting the mixed frame as a frame of an output video stream.

7. The system for delivering graphics over a network of claim 6, wherein when a new 3D model appears in the 3D environment, then all 3D models beyond that new 3D model will be encoded into the frame, no matter those 3D models are pre-stored in the client device or not.

8. The system for delivering graphics over a network of claim 6, wherein in Step (C), the server also sends a status information of 3D models that are not encoded into the frame to the client device; the client device receives and checks the status information in such a manner that, if any 3D model contained in the status information is not pre-stored in the client device, then the client device sends a request to the server in order to download that 3D model.

9. The system for delivering graphics over a network of claim 8, wherein the status information includes meta data of each 3D model that is not encoded into the frame, said meta data include a name, a position, a velocity and an attribute of each 3D model.

10. The system for delivering graphics over a network of claim 6, wherein the server further comprises:
- a 3D Scene Transmitter which is a library either compiled within the application or dynamically linked in runtime with the application; wherein the 3D Scene Transmitter keeps a list of all 3D models and the status of each 3D model; wherein said status is used to indicate the 3D model being in one of the following status: "Not Ready", "Loading" and "Ready for Client"; and
- a 3D Scene Server which is a server program running on server with the application; wherein, the 3D Scene Server acts as a hub of message transfer between the 3D Scene Transmitter and the client device, the 3D Scene Server also acts as a file download server for the client device to download necessary 3D models from the server.

11. The system for delivering graphics over a network of claim 10, wherein the client device further comprises:
- a 3D Scene Client which is a program running on the client device for producing the output video stream and for communicating with the server via the network; and
- a 3D Scene Cache for storing at least the 3D models previously downloaded from the server.

* * * * *